United States Patent
Wood et al.

(10) Patent No.: US 8,105,985 B2
(45) Date of Patent: Jan. 31, 2012

(54) FRICTION LOSS REDUCTION IN VISCOELASTIC SURFACTANT FRACTURING FLUIDS USING LOW MOLECULAR WEIGHT WATER-SOLUBLE POLYMERS

(75) Inventors: William Russell Wood, Spring, TX (US); James B. Crews, Willis, TX (US)

(73) Assignee: Baker Hughes Incorporated, Houston, TX (US)

( * ) Notice: Subject to any disclaimer, the term of this patent is extended or adjusted under 35 U.S.C. 154(b) by 0 days.

(21) Appl. No.: 12/418,726

(22) Filed: Apr. 6, 2009

(65) Prior Publication Data
US 2009/0192056 A1 Jul. 30, 2009

Related U.S. Application Data

(62) Division of application No. 11/828,784, filed on Jul. 26, 2007, now Pat. No. 7,530,393.

(60) Provisional application No. 60/833,832, filed on Jul. 27, 2006.

(51) Int. Cl.
*C09K 8/08* (2006.01)
*C09K 8/12* (2006.01)

(52) U.S. Cl. ........ 507/213; 507/211; 507/219; 507/225; 507/240; 507/245; 507/260; 507/267; 166/282; 166/283

(58) Field of Classification Search .................. None
See application file for complete search history.

(56) References Cited

U.S. PATENT DOCUMENTS

| | | | |
|---|---|---|---|
| 3,943,060 A | 3/1976 | Martin et al. | |
| 4,499,214 A | 2/1985 | Sortwell | |
| 4,615,825 A * | 10/1986 | Teot et al. | 516/67 |
| 5,036,136 A * | 7/1991 | Peiffer | 524/812 |
| 5,858,928 A * | 1/1999 | Aubert et al. | 507/128 |
| 5,939,362 A | 8/1999 | Johnson et al. | |
| 6,194,356 B1 * | 2/2001 | Jones et al. | 507/225 |
| 6,488,091 B1 | 12/2002 | Weaver et al. | |
| 6,938,693 B2 | 9/2005 | Boney et al. | |
| 7,066,260 B2 | 6/2006 | Sullivan et al. | |
| 7,125,825 B2 | 10/2006 | Moss | |
| 7,265,079 B2 * | 9/2007 | Willberg et al. | 507/203 |
| 7,281,581 B2 | 10/2007 | Nguyen et al. | |
| 2003/0125215 A1 * | 7/2003 | Schwartz et al. | 507/121 |
| 2003/0139298 A1 * | 7/2003 | Fu et al. | 507/200 |
| 2004/0097385 A1 * | 5/2004 | Chen et al. | 510/130 |
| 2005/0034862 A1 * | 2/2005 | Nguyen | 166/281 |
| 2006/0027369 A1 | 2/2006 | Baycroft et al. | |
| 2006/0073980 A1 | 4/2006 | Brannon et al. | |
| 2006/0205605 A1 | 9/2006 | Dessinges et al. | |
| 2006/0211776 A1 * | 9/2006 | Crews | 516/194 |

(Continued)

FOREIGN PATENT DOCUMENTS
GB 2397595 A 7/2004

*Primary Examiner* — John J Figueroa
(74) *Attorney, Agent, or Firm* — Mossman Kumar & Tyler PC

(57) ABSTRACT

Adding relatively low molecular weight water-soluble friction loss reduction polymers to an aqueous fluid gelled with a viscoelastic surfactant (VES) increases the critical generalized Reynold's number at which the Fanning friction factor increases and friction pressure starts to increase rapidly. The water-soluble polymeric friction loss reduction additives lower surface pumping pressure in VES-gelled fracturing fluids for a given pump rate, thus lowering hydraulic horsepower (HHP) requirements for pumping fluids downhole, e.g. for hydraulic fracturing or frac packing treatments of subterranean formations.

5 Claims, 2 Drawing Sheets

U.S. PATENT DOCUMENTS

2006/0254774 A1* 11/2006 Saini et al. .................. 166/300
2006/0272816 A1  12/2006 Willberg et al.
2007/0039733 A1*  2/2007 Welton et al. ............... 166/276
2007/0056736 A1   3/2007 Welton et al.
2007/0114030 A1   5/2007 Todd et al.
2007/0125536 A1   6/2007 Acock et al.

* cited by examiner

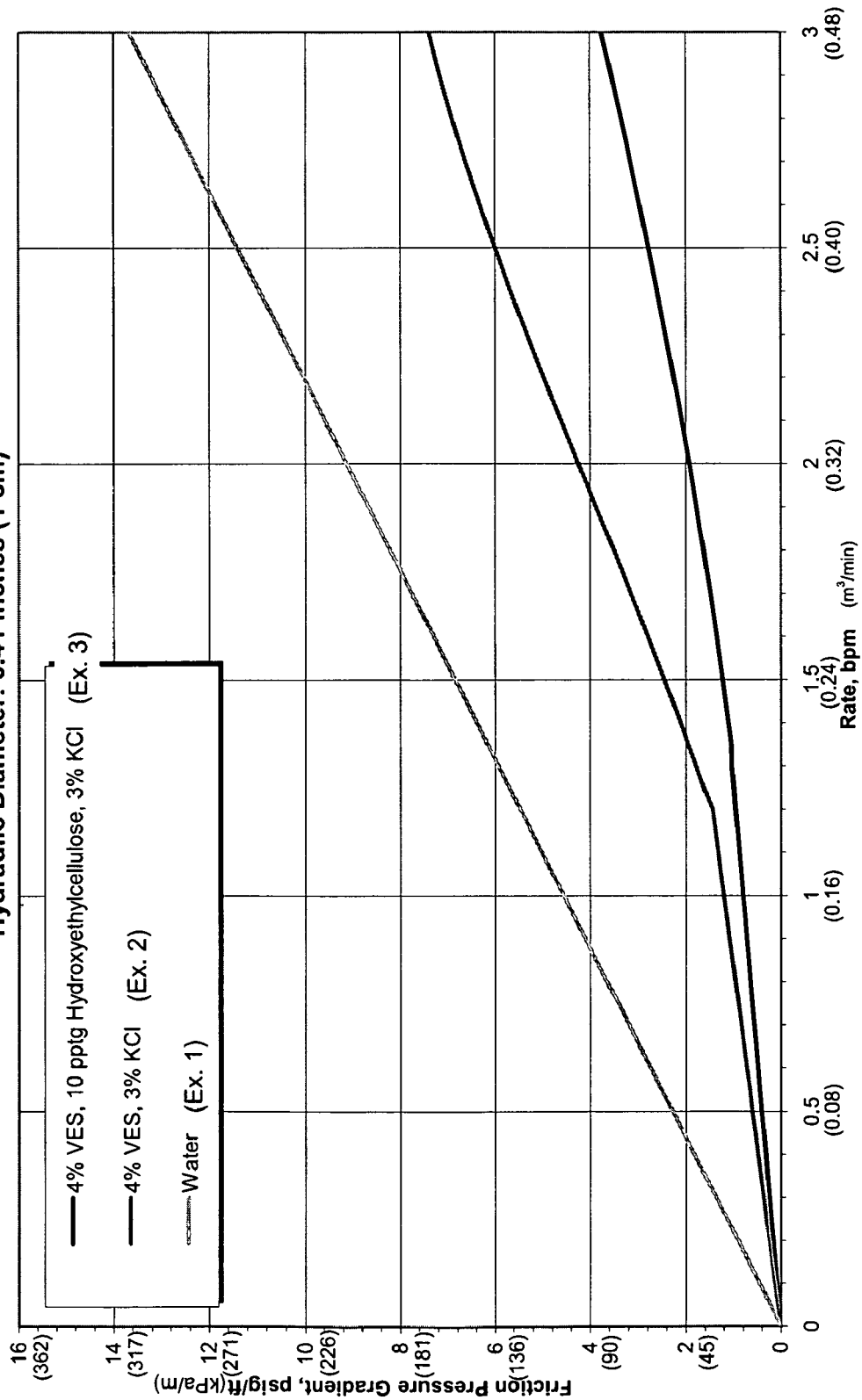

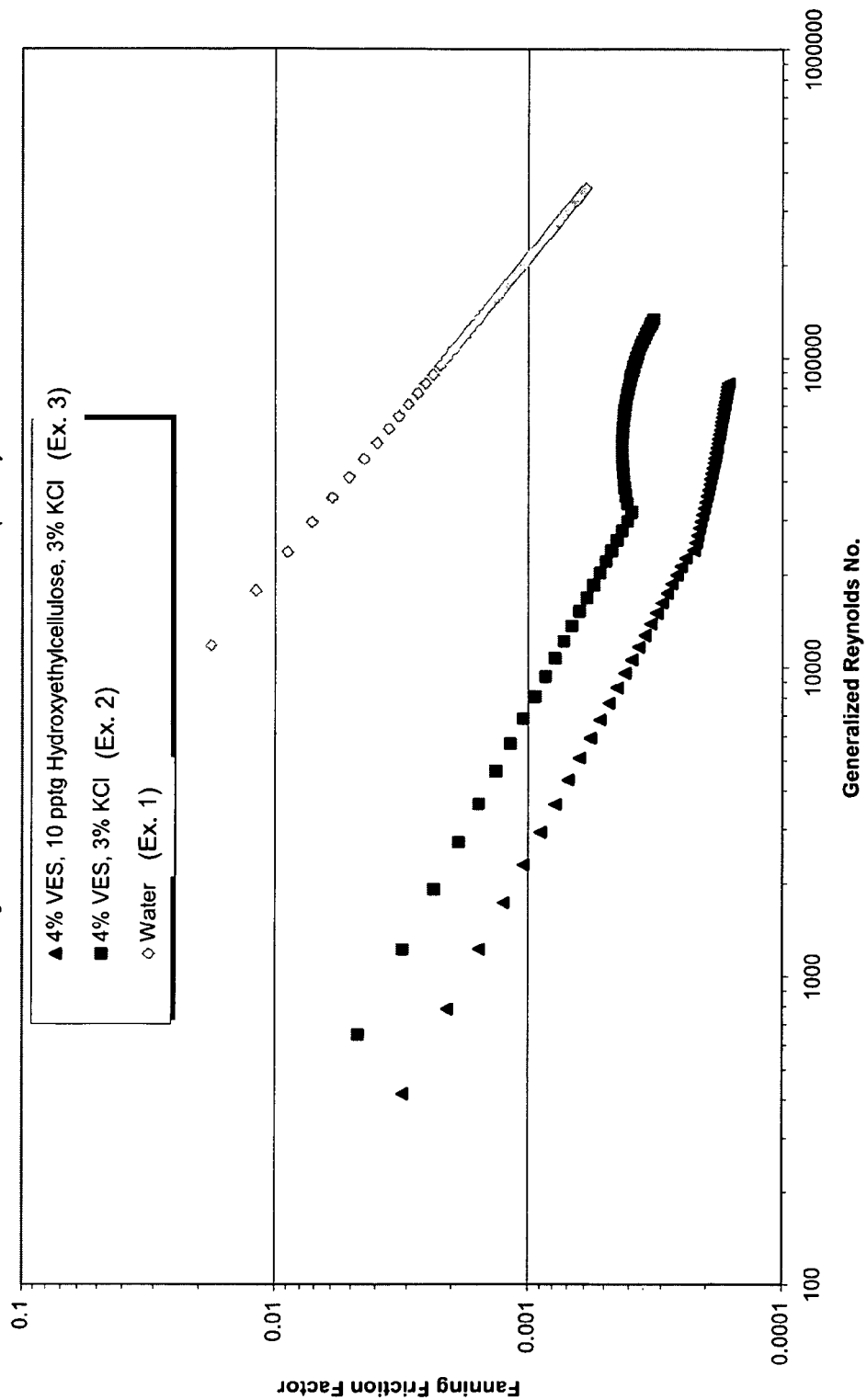

FRICTION LOSS REDUCTION IN VISCOELASTIC SURFACTANT FRACTURING FLUIDS USING LOW MOLECULAR WEIGHT WATER-SOLUBLE POLYMERS

CROSS-REFERENCE TO RELATED APPLICATIONS

This application is a divisional application of U.S. patent application Ser. No. 11/828,784 filed Jul. 26, 2007, issued May 12, 2009 as U.S. Pat. No. 7,530,393, which claims the benefit of U.S. Provisional Patent Application No. 60/833,832 filed Jul. 27, 2006.

TECHNICAL FIELD

The present invention relates to aqueous, viscoelastic surfactant-gelled fluids used during hydrocarbon recovery operations, and more particularly relates, in one embodiment, to methods and additives for controlling the friction losses thereof.

BACKGROUND

Hydraulic fracturing is a method of using pump rate and hydraulic pressure to fracture or crack a subterranean formation. Once the crack or cracks are made, high permeability proppant, relative to the formation permeability, is pumped into the fracture to prop open the crack. When the applied pump rates and pressures are reduced or removed from the formation, the crack or fracture cannot close or heal completely because the high permeability proppant keeps the crack open. The propped crack or fracture provides a high permeability path connecting the producing wellbore to a larger formation area to enhance the production of hydrocarbons.

The development of suitable fracturing fluids is a complex art because the fluids must simultaneously meet a number of conditions. For example, they must be stable at high temperatures and/or high pump rates and shear rates which can cause the fluids to degrade and prematurely settle out the proppant before the fracturing operation is complete. Various fluids have been developed, but most commercially used fracturing fluids are aqueous based liquids which have either been gelled or foamed. When the fluids are gelled, typically a polymeric gelling agent, such as a solvatable polysaccharide is used, which may or may not be crosslinked. The thickened or gelled fluid helps keep the proppants within the fluid during the fracturing operation.

While polymers have been used in the past as gelling agents in fracturing fluids to carry or suspend solid particles in the brine, such polymers require separate breaker compositions to be injected to reduce the viscosity. Further, the polymers tend to leave a coating on the proppant even after the gelled fluid is broken, which coating may interfere with the functioning of the proppant. Studies have also shown that "fish-eyes" and/or "microgels" present in some polymer gelled carrier fluids will plug pore throats, leading to impaired leakoff and causing formation damage. Conventional polymers are also either cationic or anionic which present the disadvantage of likely damage to the producing formations.

Aqueous fluids gelled with viscoelastic surfactants (VESs) are also known in the art. VES-gelled fluids have been widely used as gravel-packing, frac-packing and fracturing fluids because they exhibit excellent rheological properties and are less damaging to producing formations than crosslinked polymer fluids. VES fluids are non-cake-building fluids, and thus leave no potentially damaging polymer cake residue.

Viscoelastic surfactant (VES) gelled aqueous fluids have excellent friction loss reduction properties below a certain, but often undefined critical generalized Reynold's number. Above this critical generalized Reynold's number, as the generalized Reynold's number increases, the Fanning friction factor increases and thus, friction pressure increases rapidly to values that cause surface pumping pressure to approach preset limits.

It would thus be desirable if the VES-gelled fluid could be modified in some way that increases this critical generalized Reynold's number to slow the rate of friction pressure increase so that additional friction losses may be avoided or minimized at the same flow rate and/or pumping horsepower.

In general, friction reducers are known additives, typically in slurry or liquid form, used to reduce the friction forces experienced by tools and tubulars in the wellbore. Friction reducers are routinely used in horizontal and highly deviated wellbores where the friction forces limit the passage of tools along the wellbore.

In a different discipline and technological art, drag reducing agents are used in the pumping of hydrocarbons long distance to reduce the drag of the hydrocarbon, typically crude oil, as it travels through a pipeline, as well as to reduce the horsepower requirements necessary to pump the hydrocarbon. Such drag reducing agents or DRAs are typically hydrocarbon-soluble polymers. Conversely, water-soluble polymers are known to reduce the drag and horsepower requirements involved in pumping aqueous fluids, typically water, through pipelines.

SUMMARY

There is provided, in one form, a method for treating a subterranean formation that involves providing an aqueous viscoelastic treating fluid which includes an aqueous base fluid, a viscoelastic surfactant (VES) gelling agent, and a polymeric, water-soluble friction loss reduction agent that has a weight average molecular weight of 250,000 or less. The amount of friction loss reduction agent is effective to improve the flow of the aqueous viscoelastic treating fluid as compared with an identical fluid absent the agent. The aqueous viscoelastic surfactant treating fluid is introduced or injected through a wellbore and into the subterranean formation, and the subterranean formation is treated with the fluid.

There is further provided in another non-limiting embodiment an aqueous viscoelastic treating fluid that includes an aqueous base fluid, a viscoelastic surfactant (VES) gelling agent, and a water-soluble, polymeric friction loss reduction agent having a weight average molecular weight of 250,000 or less.

BRIEF DESCRIPTION OF THE DRAWINGS

FIG. 1 is a graph of friction pressure gradient as a function of pump rate in a tube for water, a 3% KCl brine containing 4% of a VES, and a 3% KCl brine containing 4% of the VES and additionally 10 pounds per thousand gallons (pptg) (1.2 kg/m$^3$) hydroxyethylcellulose (HEC); and FIG. 2 is a graph of Fanning friction factor as a function of generalized Reynold's number for the same three fluids as in FIG. 1.

DETAILED DESCRIPTION

It has been discovered that the addition of water-soluble polymers to the VES-gelled fluid increases the critical generalized Reynold's number at which the Fanning friction factor increases and friction pressure starts to increase rapidly. Thus, the water-soluble polymers have the effect of lowering surface pumping pressure in a VES-gelled aqueous fluid, such as a fracturing fluid, for a given pump rate, thus lowering hydraulic horsepower (HHP) requirements. The use of friction loss reduction agents together with viscoelastic surfactants in aqueous treating fluids, such as fracturing fluids or frac pack fluids and the like, which may be brines, is not believed to be known.

The term generalized Reynold's number is used to refer to a general relationship for Newtonian and Power Law non-Newtonian fluids. The generalized Reynold's number ($Re_g$) may be defined as follows:

$$Re_g = \frac{PU^{(2-n')}D^{n'}}{Kp8^{n'-1}}$$

where
P=density of the fluid,
U=average velocity of the fluid flow,
D=inside pipe diameter,
n'=power law index, and
Kp=consistency index for pipe flow For a Newtonian fluid, n'=1 and Kp=viscosity, and thus the generalized Reynold's number ($Re_g$)=the Reynold's number (Re)=PUD/viscosity. To call $Re_g$ "critical" is simply to indicate that in a particular system, for $Re_g$ at or above that critical value, the Fanning friction factor increases and the friction pressure increases rapidly and undesirably, such as to cause pumping pressure to approach limits of the system; in the case of pumping a fracturing fluid downhole, to cause the surface pumping pressure to reach those limits. As a practical matter, it is not necessary to define or know what the critical $Re_g$ is for a particular system, since it will be apparent to an operator that the pumping horsepower requirements have noticeably increased. This increase would be an indicator that the use of a water-soluble friction loss reduction agent would be warranted or desired.

More specifically, the methods and compositions herein relate to the practice of frac packing and hydraulic fracturing with VES-gelled aqueous fluids, as well as other applications where VES-gelled aqueous fluids are used, transported, pumped and the like. For instance, when a frac pack or hydraulic fracturing fluid is pumped into the well down the tubulars (tubular goods) the fluid moving in the tube creates friction pressure. Friction pressure generated for a given rate causes the surface pumping pressure to increase, with a consequent increase in hydraulic horsepower. An excessive amount of friction pressure can cause failure to achieve flow rate, as well as undesirable excessive pressure on the surface equipment. To reduce friction pressure, the methods and compositions herein have been developed whereby a water-soluble polymer is added to the VES fluid.

Suitable water-soluble, polymeric friction loss reduction agent include, but are not necessarily limited to, water-soluble gums (naturally-occurring polymers) and their derivatives: such as guar, guar derivatives (i.e. derivatives of guar such as hydroxypropyl guar (HPG), hydroxyethyl guar (HEG), carboxymethyl guar (CMG), carboxyethyl guar (CEG), carboxymethyl hydroxypropyl guar (CMHPG), and the like), cellulose derivatives (i.e. derivatives of cellulose such as hydroxyethylcellulose (HEC), hydroxypropylcellulose (HPC), carboxymethylcellulose (CMC), carboxyethylcellulose (CEC), carboxymethyl hydroxyethyl cellulose (CMHEC), carboxymethyl hydroxypropyl cellulose (CMHPC), and the like), karaya, locust bean, pectin, tragacanth, acacia, carrageenan, alginates (such as salts of alginate, propylene glycol alginate, and the like), agar, gellan, xanthan, scleroglucan and mixtures thereof. It will be appreciated that in general the use of the term "derivative" with respect to these naturally-occurring, water-soluble gums includes hydroxyalkyl and carboxyalkyl derivatives thereof or both. Another class of suitable water-soluble friction loss reduction agents includes, but is not necessarily limited to, synthetic polymers such as acrylate polymers, acrylamide polymers, 2-acrylamido-2-methyl propane sulfonate (AMPS), acetamide polymers, formamide polymers, and mixtures thereof, including copolymers of these monomers. The naturally-occurring polymers may be used together with the synthetic polymers. In the Examples noted below, the water soluble polymer tested was a hydroxyethyl-cellulose (HEC-10). It should also be appreciated that the polymer, whether naturally-occurring or synthetic, may be crosslinked. In one non-limiting embodiment the polymer is crosslinked, which may be useful in some applications, whereas in a different non-restrictive embodiment, the polymer is not crosslinked.

It is recognized that some of the water-soluble polymers noted to be useful as friction loss reduction agents are those traditionally used to gel or increase viscosity of aqueous fluids. However, it is expected that they are used in the methods and compositions herein in sufficiently low proportions that concerns such as coating the proppants, microgels and damage to the formation will not occur. Furthermore, although the polymers are the same, the size of the polymer chains employed is less than those generally used. Water-soluble polymers of the customary size may still have the potential to cause formation damage. Thus, the polymers used herein as friction loss reduction agents are generally of low molecular weight, such as on the order of 250,000 molecular weight or less, alternatively 125,000 molecular weight or less. Unless otherwise specified, all molecular weights herein are weight average molecular weights.

These relatively smaller molecular weight polymers are small enough to not build a damaging filter cake, where the smaller polymers go into the pores of the reservoir, but may still be produced back out. These low molecular weight polymers may be manufactured from the customary monomers to no larger than the specified sizes, or may be conventionally-sized polymers that have been "depolymerized" or reduced in size, such as by U.S. Pat. No. 6,488,091, incorporated herein in its entirety by reference. Alternatively, the low molecular weight polymers found to be useful herein may be made by some other technique.

By using the relatively low molecular weight polymers, the VES-gelled fluid would retain its very low formation damaging quality that is characteristic and unique to VES-gelled fluids, but the polymers would not be sufficiently large to cause damage.

The amount of friction loss reduction agent in the aqueous viscoelastic gelled fluid may range in one non-limiting embodiment from about 2 to about 40 pptg (about 0.2 to about 4.8 kg/m$^3$) based on the total aqueous viscoelastic treating fluid. Alternatively, the lower end of the range of the friction loss reduction agent may be about 4 pptg (0.48 kg/m$^3$), alternatively about 10 pptg (1.2 kg/m$^3$), and independently the upper end of the range may be about 30 pptg (3.6 kg/m$^3$), alternatively up to 20 pptg (2.4 kg/m$^3$). If friction pressure performance is lowered by using lower molecular weight polymers, then the increased amount of total polymer used is still much less damaging to achieve equivalent friction reduction while yet reducing the amount of formation damage that may be due to using polymers in a VES-gelled fluid, if any.

The lower molecular weight polymers herein in one non-limiting acceptable embodiment may have very low impurities, be sized small enough to be non-pore plugging or filter cake producing, that is, be able to be transported within and back out of the reservoir pores easily. These lower molecular weight polymers may be used in a prehydrated concentrate form that has little, if any, microgels (polymer masses or accumulations that are not dispersed as individual polymers in the final VES fluids), where the prehydrated concentrate may be even less damaging when used in VES-gelled fluids in field operations. Solvents useful in prehydrated concentrates of the low molecular weight polymers include, but are not necessarily limited to, glycol (monoethylene glycol or MEG), propylene glycol, diethylene glycol, triethylene glycol, dipropylene glycol, tripropylene glycol, butylene glycol, and mixtures thereof, or any other solvent that is compatible with the rheology of the final mixture of the VES-gelled fluid. These low molecular weight polymers may also be used in a slurried concentrate form with an optional base suspension fluid agent that pre-wets the polymer particles and/or individual polymers to aid the dispersion and hydration of the individual polymers in brine. Base suspension fluid agents useful in pre-wetting concentrates of low molecular weight polymers include, but are not necessarily limited to, glycol ethers such as ethylene glycol n-propyl ether, ethylene glycol n-butyl ether, diethylene glycol ethyl ether, diethylene glycol methyl ether, diethylene glycol n-butyl ether, propylene glycol methyl ether, dipropylene glycol methyl ether, dipropylene glycol dimethyl ether, propylene glycol n-propyl ether, propylene glycol n-butyl ether, dipropylene glycol n-butyl ether and mixtures thereof.

The polymer or the combination of polymers described above may be added to the mix water (brine or fresh) either in powder form for batch mixing or in liquid form for continuous mixing or batch mixing operations. No special or unusual mixing equipment or techniques are required. The VES may be added at the same time as the water soluble polymer or may be added later in the process. After the water-soluble polymer (s) and VES are added to the mix water the fluid is pumped into the well down the tubulars as clean fluid or proppant is added to the fluid and the fluid (slurry) pumped into the well down the tubulars. The clean fluid or pad fluid will create the fracture in the frac pack or hydraulic fracturing procedure while the proppant-laden fluid will fill the fracture and prop or keep the created fracture open so that oil and/or gas may flow through the fracture to the well.

The aqueous base fluid could be, for example, water, brine, aqueous-based foams or water-alcohol mixtures. The brine base fluid may be any brine, conventional or to be developed which serves as a suitable media for the various components. As a matter of convenience, in many cases the brine base fluid may be the brine available at the site used in the completion fluid, for a non-limiting example.

In the non-limiting embodiment where the aqueous fluid is brine, the brines may be prepared using salts including, but not necessarily limited to, NaCl, KCl, $CaCl_2$, $MgCl_2$, $NH_4Cl$, $CaBr_2$, $NaBr_2$, sodium formate, potassium formate, and other commonly used stimulation and completion brine salts. The concentration of the salts to prepare the brines can be from about 0.5% by weight of water up to near saturation for a given salt in fresh water, such as 10%, 20%, 30% and higher percent salt by weight of water. The brine may be a combination of one or more of the mentioned salts, such as a brine prepared using NaCl and $CaCl_2$ or NaCl, $CaCl_2$, and $CaBr_2$ as non-limiting examples.

The viscoelastic surfactants suitable for use in these methods and compositions include, but are not necessarily limited to, non-ionic, cationic, amphoteric, and zwitterionic surfactants. Specific examples of zwitterionic/amphoteric surfactants include, but are not necessarily limited to, dihydroxyl alkyl glycinate, alkyl ampho acetate or propionate, alkyl betaine, alkyl amidopropyl betaine and alkylimino mono- or di-propionates derived from certain waxes, fats and oils. Quaternary amine surfactants are typically cationic, and the betaines are typically zwitterionic. The thickening agent may be used in conjunction with an inorganic water-soluble salt or organic additive such as phthalic acid, salicylic acid or their salts.

Some non-ionic fluids are inherently less damaging to the producing formations than cationic fluid types, and are more efficacious per pound than anionic gelling agents. Amine oxide viscoelastic surfactants have the potential to offer more gelling power per pound, making it less expensive than other fluids of this type.

The amine oxide gelling agents $RN^+(R')_2 O^-$ may have the following structure (I):

where R is an alkyl or alkylamido group averaging from about 8 to 24 carbon atoms and R' are independently alkyl groups averaging from about 1 to 6 carbon atoms. In one non-limiting embodiment, R is an alkyl or alkylamido group averaging from about 8 to 16 carbon atoms and R' are independently alkyl groups averaging from about 2 to 3 carbon atoms. In an alternate, non-restrictive embodiment, the amine oxide gelling agent is tallow amido propylamine oxide (TAPAO), which should be understood as a dipropylamine oxide since both R' groups are propyl.

Materials sold under U.S. Pat. No. 5,964,295 include ClearFRAC™, which may also comprise greater than 10% of a glycol. This patent is incorporated herein in its entirety by reference. One preferred VES is an amine oxide. As noted, a particularly preferred amine oxide is tallow amido propylamine oxide (TAPAO), sold by Baker Oil Tools as SurFRAQ™ VES. SurFRAQ is a VES liquid product that is 50% TAPAO and 50% propylene glycol. These viscoelastic surfactants are capable of gelling aqueous solutions to form a gelled base fluid. The additives of herein may also be used in Diamond FRAQ™ which is a VES system, similar to SurFRAQ, which contains VES breakers sold by Baker Oil Tools.

The amount of VES included in the fracturing fluid depends on at least two factors. One involves generating, creating or producing enough viscosity to control the rate of fluid leak off into the pores of the fracture, which is also dependent on the type and amount of fluid loss control agent used, and the second involves creating, generating or producing a viscosity high enough to develop the size and geometry of the fracture within the reservoir for enhanced reservoir production of hydrocarbons and to also keep the proppant particles suspended therein during the fluid injecting or introducing step, in the non-limiting case of a fracturing fluid. Thus, depending on the application, the VES is added to the aqueous fluid in concentrations ranging from about 0.5 to 12.0% by volume of the total aqueous fluid (5 to 120 gallons per thousand gallons (gptg)). In another non-limiting embodiment, the proportion range herein may be from about 1.0 to about 6.0% by volume VES product. In an alternate, non-restrictive form of the methods and compositions herein, the amount of VES ranges from about 2 independently up to about 10 volume %.

In hydraulic fracturing applications, propping agents are typically added to the base fluid after the addition of the VES. Propping agents include, but are not limited to, for instance, quartz sand grains, sized calcium carbonate, other sized salts, glass and ceramic beads, bauxite grains (which may be sintered), walnut shell fragments, aluminum pellets, nylon pellets, and the like. The propping agents are normally used in concentrations between about 1 to 14 pounds per gallon (120-1700 kg/m$^3$) of fracturing fluid composition, but higher or lower concentrations can be used as the fracture design requires. These proppants, solid particles or gravel may also serve as a screen. The base fluid can also contain other conventional additives common to the well service industry such as water wetting surfactants, non-emulsifiers and the like. In this methods and compositions herein, the base fluid can also contain additives which can contribute to breaking the gel (reducing the viscosity) of the VES fluid.

While the viscoelastic fluids are described most typically herein as having use in fracturing fluids, it is expected that they will find utility in completion fluids, gravel pack fluids, fluid loss pills, lost circulation pills, diverter fluids, foamed fluids, stimulation fluids and the like.

In another non-restrictive embodiment herein, the treatment fluid may contain other viscosifying agents, other, different surfactants, clay stabilization additives, scale dissolvers, biopolymer degradation additives, fluid loss control additives, high temperature stabilizers, and other common and/or optional components.

The invention will be further described with respect to the following Examples which are not meant to limit the invention, but rather to further illustrate the various embodiments.

EXAMPLES

Shown in FIG. 1 is a plot of a friction pressure reduction of a VES-gelled fluid as well as a VES-gelled fluid with a water-soluble polymer in a tube having a hydraulic diameter of 0.41 inches (1 cm). The graph is friction pressure gradient in psig/ft as a function of pump rate in bpm. SI units of kPa/meter and m$^3$/minute, respectively, are given in the Figures in parentheses. Water (Example 1) clearly has the steepest curve, showing friction pressure rapidly increasing with flow rate. The addition of 4% VES (WG-3L surfactant by Baker Oil Tools) to a 3% KCl brine (Example 2) sharply reduces the rate of friction pressure increase simply on its own, as previously noted. However, at about 1.2 bpm (0.19 m$^3$/min), it may be seen that the friction pressure for Example 2 also begins to rise rapidly. This change in rate is an indication that the critical $Re_g$ has been reached.

When 10 pptg (1.2 kg/m$^3$) hydroxyethylcellulose is added to the Example 2 fluid to give the Example 3 fluid, the friction pressure rise is further reduced and rises even less sharply, indicating that the HEC was having the desired friction reduction.

A similar progression is seen in FIG. 2, which is a plot of Fanning Friction Factor as a function of generalized Reynold's number for the fluids of Examples 1, 2 and 3 discussed above. Again, water gives the steepest slope, with highest Friction Factor over the range given. The Friction Factor for the Example 2 fluid with 4% VES in 3% KCl brine is significantly reduced compared to the water, and the further addition of 10 pptg (1.2 kg/m$^3$) hydroxyethylcellulose lowers the Friction Factor even further. Thus, the use of a friction loss reduction agent herein has been shown to greatly reduce friction relative to the $Re_g$. Or stated another way, the use of the friction loss reduction agents herein increases the critical $Re_g$ for a given system.

In the foregoing specification, the invention has been described with reference to specific embodiments thereof, and has been demonstrated as effective in reducing friction losses for surfactant gelled fluids. However, it will be evident that various modifications and changes can be made thereto without departing from the broader spirit or scope of the invention as set forth in the appended claims. Accordingly, the specification is to be regarded in an illustrative rather than a restrictive sense. For example, specific combinations of brines, viscoelastic surfactants, relatively low molecular weight water soluble polymers (natural and/or synthetic) and other components falling within the claimed parameters, but not specifically identified or tried in a particular composition, are anticipated to be within the scope of this invention.

What is claimed is:

1. An aqueous viscoelastic treating fluid comprising:
   an aqueous brine base fluid gelled by from about 0.2 to about 12.0 vol % of the total aqueous viscoelastic treating fluid of a viscoelastic surfactant (VES) gelling agent; and
   a water-soluble, polymeric friction loss reduction agent having a molecular weight of 250,000 or lower, and which is selected from the group consisting of karaya, locust bean, pectin, tragacanth, acacia, agar, scleroglucan; and polymers and copolymers selected from the group consisting of acetamide, and formamide.

2. The fluid of claim 1 where the amount of water-soluble, polymeric friction loss reduction agent is effective to improve the flow of the aqueous viscoelastic treating fluid as compared with an identical fluid absent the agent when the fluid is flowed at or above a critical generalized Reynold's number at which friction pressure would rapidly increase, but for the presence of the friction loss reduction agent.

3. The fluid of claim 1 where the friction loss reduction agent has a molecular weight of 125,000 or lower.

4. An aqueous viscoelastic treating fluid comprising:
   a brine base fluid gelled by from about 0.2 to about 12.0 vol % of the total aqueous viscoelastic treating fluid of a viscoelastic surfactant (VES) gelling agent; and
   from about 2 to about 40 pptg (about 0.2 to about 4.8 kg/m$^3$) of a water-soluble, polymeric friction loss reduction agent where the friction loss reduction agent has a molecular weight of 250,000 or lower and is selected from the group consisting of karaya, locust bean, pectin, tragacanth, acacia, agar, scleroglucan; and polymers and copolymers selected from the group consisting of acetamide, and formamide.

5. An aqueous viscoelastic treating fluid comprising:
   a brine base fluid gelled by from about 0.2 to about 12.0 vol % of the total aqueous viscoelastic treating fluid of a viscoelastic surfactant (VES) gelling agent; and
   from about 2 to about 40 pptg (about 0.2 to about 4.8 kg/m$^3$) of a water-soluble, polymeric friction loss reduction agent where the friction loss reduction agent has a molecular weight of 125,000 or lower and is selected from the group consisting of karaya, locust bean, pectin, tragacanth, acacia, agar, scleroglucan; and polymers and copolymers selected from the group consisting of acetamide, and formamide.

* * * * *